United States Patent [19]

Hakata

[11] 3,889,110

[45] June 10, 1975

[54] DATA STORING SYSTEM HAVING SINGLE STORAGE DEVICE

[75] Inventor: Masayuki Hakata, Iruma, Japan

[73] Assignee: Casio Computer Co., Ltd., Tokyo, Japan

[22] Filed: Feb. 28, 1973

[21] Appl. No.: 336,502

[30] Foreign Application Priority Data

Mar. 3, 1972 Japan ............................ 47-022086

[52] U.S. Cl. ................................................ 235/176

[51] Int. Cl. ............................................... G06f 7/38

[58] Field of Search ......... 340/172.5; 235/168, 170, 235/176

[56] References Cited

UNITED STATES PATENTS

| | | | |
|---|---|---|---|
| 3,469,085 | 9/1969 | Asada et al. | 340/172.5 X |
| 3,531,632 | 9/1970 | Herr | 235/176 |
| 3,536,903 | 10/1970 | Goshorn et al. | 235/168 |
| 3,564,226 | 2/1971 | Seligman | 235/168 X |
| 3,588,841 | 6/1971 | Ragen | 340/172.5 |
| 3,609,696 | 9/1971 | Doting | 340/172.5 |
| 3,621,219 | 11/1971 | Washizuka et al. | 235/170 |
| 3,674,997 | 7/1972 | Hamano | 235/176 X |

*Primary Examiner*—Raulfe B. Zache
*Attorney, Agent, or Firm*—Flynn & Frishauf

[57] ABSTRACT

A data storage system utilizing a unique bit arrangement and circuit configuration including a single storage device, such as a single storage-type shift register means, which enables two data items to be simultaneously read-out and operated on. Also, the read-out data can be re-stored with a left or right shift, still using only the single storage device.

8 Claims, 3 Drawing Figures

DATA STORING SYSTEM HAVING SINGLE STORAGE DEVICE

BACKGROUND OF THE INVENTION

This invention relates to a data storage system in which plural data items are stored in a single register and any desired data items are selectively read out from the register.

In a case where an arithmetic operation of stored plural data items is effected, it was heretofore necessary to store the plural data items to be operated on into corresponding independent registers, read out the data to be operated on from the corresponding registers and supply these data items to an arithmetic operation circuit. In a case where plural data items are stored in a single register, if, for example, any two of the plural data items are added together it was necessary to read out one data item to be operated on from said single register and store it into a separate buffer register; read out the other data item to be operated on from said single register while at the same time reading out said one data item from the buffer register; and supply these data items to the arithmetic operation circuit at the same time.

In this way, if any arithmetic operation is effected between plural data items it will be necessary to store data to be operated on independently into respective juxtaposed registers and control these respective juxtaposed registers independently and at the same time. As a result, an arithmetic operation circuit is very intricate in structure and a very complicated arithmetic operation is unavoidably involved.

Accordingly, an object of this invention is to provide a data storage system capable of storing a plurality of data items in a single register and reading out necessary data items selectively from the single register.

SUMMARY OF THE INVENTION

In accordance with the present invention a data storage system comprises a data storage section including a single shift register for storing the data in a series of "combined digits." Each "combined digit" includes bit groups representative of a respective digit of numerical data, the bits of each weight or numerical significance (in the binary "weighted" system, each individually, being so arranged that the bits of the lowest weight are followed by the bits of the next successive higher weight. A data readout section is provided with means for selectively reading out any of the plural data items by selectively reading out the associated bits. According to a further aspect of this invention an arithmetic operation circuit and write-in means are further added and it is possible to read out any two data items selectively from the single shift register to effect an arithmetic operation, and write the result of the arithmetic operation into any address of the single shift register. It is possible in this case to write the resultant data, without involving a right or left shift or after left-shifting it. It is also possible to read out any one of the plural stored data items from the shift register right-shift the data and write it into the shift register.

According to a data storage system of this invention, an arithmetic operation system can be made simpler in construction and easier in operation.

DESCRIPTION OF THE PREFERRED EMBODIMENTS

Figure 1:
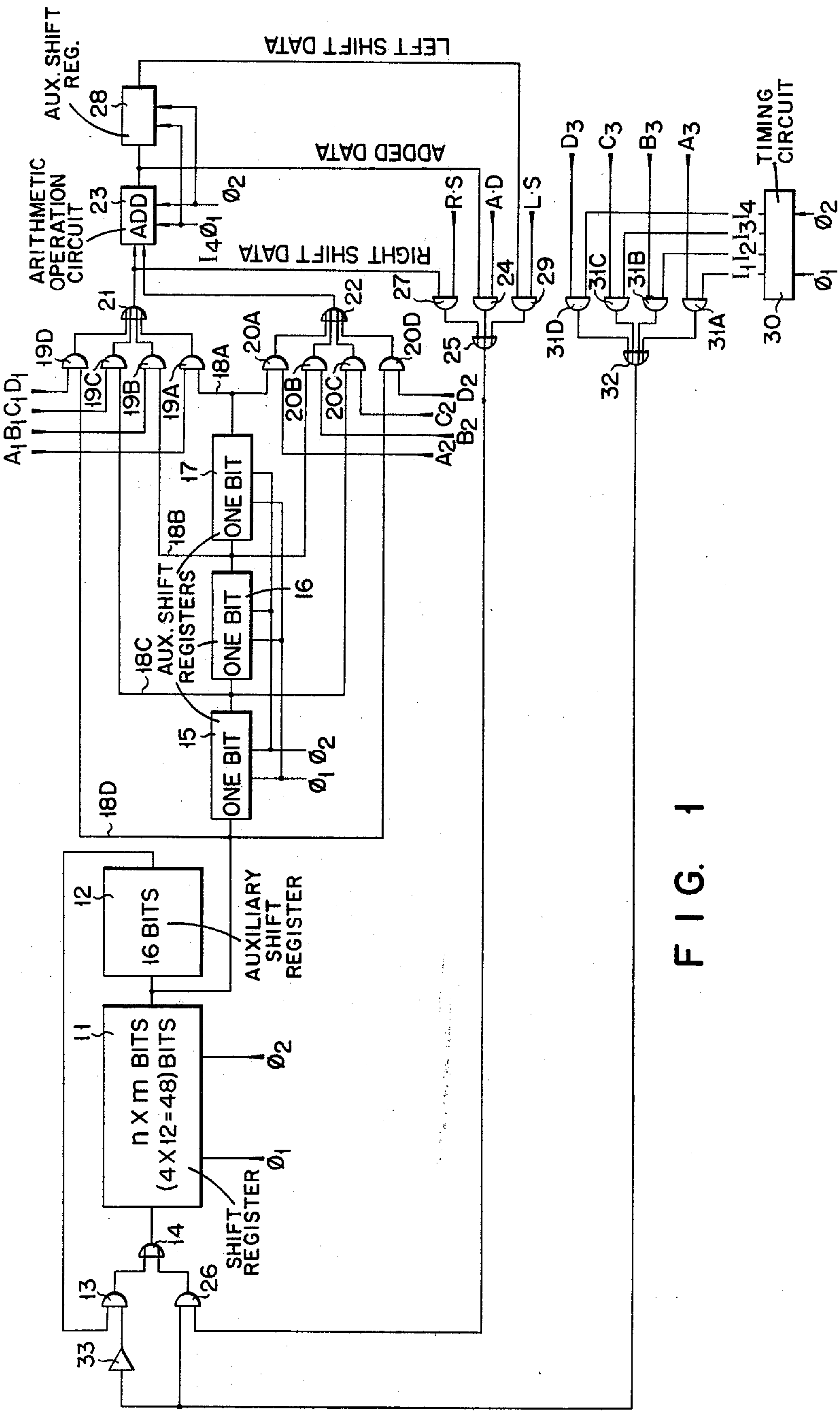
FIG. 1 is a systematic view of a storage-arithmetic operation system to which a system according to this invention is applied.
Figure 2:
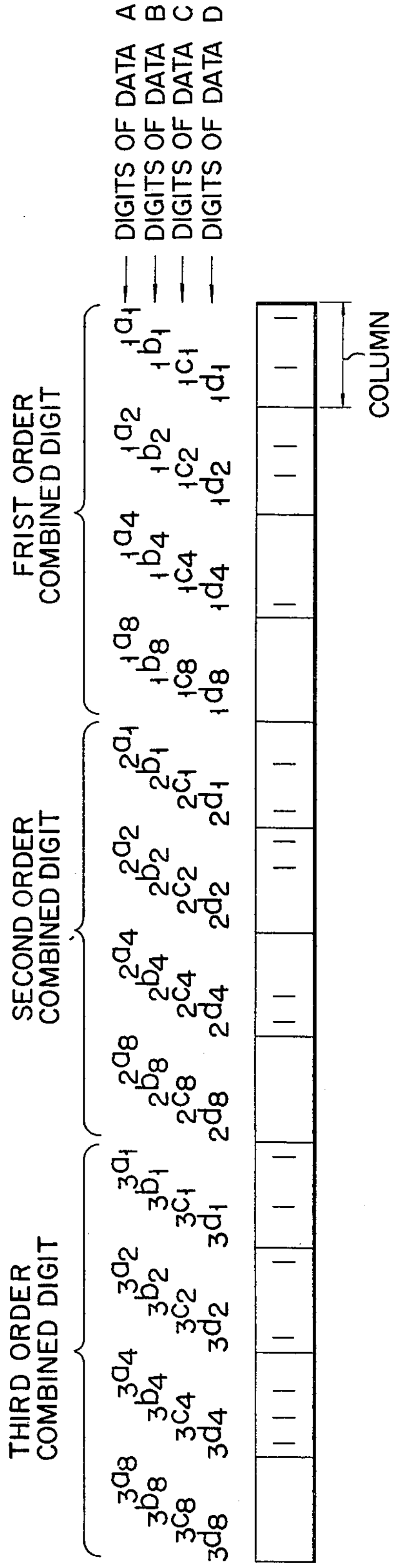
FIG. 2 is an exemplary view showing the arrangement of a storage address of plural data stored in a single shift register included in a data storing section of the system of FIG. 1.

Referring to FIG. 1 a single shift register 11 for storing data is designed to store $n$ data items, each consisting of m bits, i.e. $n \times m$ bits, therein. With this embodiment there is shown, by way of explanation, the case in which four numerical data items each representative of a 3-digit figure are stored. As shown in FIG. 2, therefore, the register is shown as having a storage capacity of $12 \times 4 = 48$ bits. The storage address of the register 11 is such that, as shown in FIG. 2, 48 bits from the above-mentioned four data items are stored in a manner to be divided into three serially arranged 'modified, digits', or 'combined digits', each consisting of 16 bits. In each 'modified or combined digit' the four bits corresponding to each number, each individually, are arranged in series. In the first 'modified or combined digit' are included 16 bits corresponding to the lowest digit of said four numerical data items; in the second 'modified or combined' 16 bits corresponding to the next higher digit of said four numerical data items; and in the third 'modified or combined digit,' 16 bits corresponding to the highest digit of said four numerical data items, respectively. The 16 bits included in each 'modified or combined digit' are stored in the register 11 in a manner to be divided into four columns each including four bits. Let 'now storing' data A, B, C and D be represented by A = 321, B = 432, C = 543 and D = 654, respectively. Then, the bits $_1a_1$–$_1a_8$, $_2a_1$–$_2a_8$ and 3 $a_1$–$3a_8$ correspond to 1, 2 and 3 of the numerical data A, respectively. Likewise, the bits $_1b_1$–$_3b_8$ correspond to the corresponding digits of the numerical data B; the bits 1$c_1$–3$c_8$ to the corresponding digits of the numerical data C; and the bits 1$d_1$–3$d_8$ to the corresponding digits of the numerical data D, respectively. Therefore, the data A can be read out by reading out the bits $_1a_1$–$_3a_8$. Likewise, the data B, C and D can be read out by reading out the bits $_1b_1$–$_3b_8$, $_1c_1$–$_3c_8$ and 1$_1d_1$–$_3d_8$, respectively.

A first auxiliary shift register 12 for storing 16 bits is connected to the output terminal of said single register so as to attain one modified digit time delay. Between the output side of the register 12 and the input side of the register 11 a circuit for cyclically shifting stored data is provided through AND circuit 13 and OR circuit 14. On the output side of said shift register 11 are serially connected second auxiliary registers 15, 16 and 17 having a capacity for storing one bit. First through fourth output lines 18A, 18B, 18C, 18D are derived from the input or output terminal of the second auxiliary registers. These output lines 18A–18D are connected to one of the input terminals of the AND circuits 19A–19D and to one of the input terminals of the AND circuits 20A–20D. To the other input terminals of the AND circuits 19A–19D and 20A–20D, address selecting signals $A_1$, $B_1$, $C_1$, $D_1$ and $A_2$, $B_2$, $C_2$, $D_2$ are supplied as gate signals. The output signals from the AND circuits 19A–19D and 20A–20D are collectively supplied to respective OR circuits 21 and 22. The outputs of these OR circuits are supplied to ADD circuit 23. The added data signal from the ADD circuit 23 is fed to the OR circuit 14 of an input circuit of the shift register 11 through AND circuit 24 whose gate is opened by an add signal A.C., OR gate 25 and AND circuit 26. Therefore, the added data can be written into the shift register 11 without effecting any shift. Addition of any two of the data A, B, C, D can be carried out by selecting the address signals.

The output signal of the OR circuit 21 for feeding any data signal to the ADD circuit 23 is also supplied to AND circuit 27 whose gate is opened by a right shift signal R.S. Said any data signal is fed to the shift register 11 through OR circuit 25, AND circuit 26 and OR circuit 14.

On the output side of the ADD circuit 23 a third auxiliary shift register 28 for delaying data signals one modified digit time, i.e. 4 columns × 4 bits, is series connected, and output data signals from the register are fed to the shift register 11 through AND circuit 29 whose gate is opened by a left shift signal L.S., OR circuit 25, AND circuit 26 and OR circuit 14.

There is provided a timing pulse generating circuit 30 necessary to control each of the above-mentioned register etc. By receiving clock pulses $\phi_1$ and $\phi_2$ the circuit 30 generates timing pulses $I_1$, $I_2$, $I_3$, $I_4$ for address selection. These timing pulses $I_1$–$I_4$ corresponding to the data A–D, respectively, are supplied to AND circuits 31A, 31B, 31C, 31D whose gates are opened by address selecting signals $A_3$, $B_3$, $C_3$, $D_3$. The output signals (said timing signals) of these AND circuits 31A–31D are fed, as gate signals, to the AND circuit 26 and to the AND circuit 13 through NOT gate circuit 33.

Figure 3:
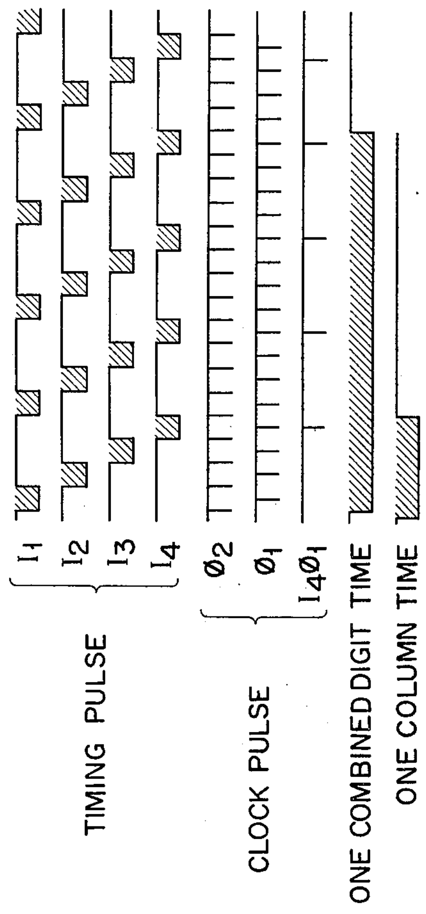
FIG. 3 is an illustrative representation showing the timing and waveform of control signals as used in the control of the circuit of FIG. 1.

With the above circuit arrangement, since the address designating signals etc. are not supplied to the respective AND gates during the time period in which addition of data and right or left shift of data are not effected, i.e. during the normal time period in which data is held in the shift register 11, the output of OR circuit 32 is in the 0 state. A gate signal is supplied from the NOT circuit 33 to the AND circuit 13 to cause its gate to be opened. Therefore, each data signal stored within the register 11 is cyclically shifted responsive to clock pulses $\phi_1$ and $\phi_2$ supplied to the register 11. The first three-bit signal from the output side of the shift register is stored in one-bit correspondence in the respective second auxiliary registers 15, 16 and 17. When addition of, for example, A and B of data A, B, C and D is effected, a four-bit information item included in such storage data column is made ready to be read out from the output lines 18A–18D. Therefore, if address signals $A_1$ and $B_1$ for selecting the respective bits of the data A and B are fed, as gate signals, to the AND circuits 19A and 20B, respectively, over one shift cycle of the shift register 11, then the respective bit signals corresponding to the data A and B are supplied to the ADD circuit 23 where these data A and B are added together. In this case, the ADD circuit is driven by a clock pulse $I_4\phi_1$ generated for each column time (see FIG. 3) and the bits ${}_1a_1$–${}_3a_8$ (corresponding to the data A) from the OR circuit 21 and the bits ${}_1b_1$–${}_3b_8$ (corresponding to the data B) from the OR circuit 22 are read into the ADD circuit where addition is effected. One modified digit time delay occurs at the ADD circuit. The output of the ADD circuit, i.e. the added data are, as mentioned above, fed to the AND circuit 26 through AND circuit 24 whose gate is opened by an adding signal AD and OR circuit 25. In this case, the added signal is delayed, one modified digit time, at the ADD circuit and the data signal in the shift register 11 is delayed, one modified digit time, within the first auxiliary register 12. Therefore, these two signals are synchronized. Suppose, for example, that the added data is written into that storage section of the register 11 corresponding to the data A. If in this case an address selecting signal $A_3$ is supplied, over one shift cycle of the shift register 11, to the AND circuit 31A, then the AND circuit 26 is caused to be opened by a timing pulse $I_1$ corresponding to the data A and an added signal is written into the register 11 without involving any right or left shift. Addition of any two data to be added together is effected for each column of the register 11. It is possible, as already set out above, to right-shift an output data signal of the OR circuit 21 through gate circuit 27 and OR circuit 25 and write it into the register 11. Since any data signal can be read out from the OR circuit 21 by selecting an address selecting signal it will be understood that any data within the register 11 can be right-shifted irrespective of the presence of the ADD circuit 23.

The data signals to be added together are delayed, one modified digit time, within the ADD circuit 23 and the added data signal is further delayed, one modified digit time, within the third auxiliary register 28. Therefore it is possible to left-shift the added signal one modified digit time, by applying a left shift signal L.S. to the AND gate circuit 29, and write it into the register 11. It will be evident that, by applying one of two input data, as a zero to the ADD circuit 23 and delaying the added signal one modified digit time at the third auxiliary register 28, it is possible to left-shift any stored data one modified digit time. Furthermore, even if an output of the OR circuit 21 is delayed, two modified digit times altogether, at a one modified digit time delay circuit (not shown) and the third auxiliary register 28, or an output of the first auxiliary shift register 12 is coupled directly to the third auxiliary register 28 to thereby effect a two modified digit time delay, it will also be evident that any data within the register 11 can be left-shifted one modified digit time.

What is claimed is:

1. A memory device for storing a plurality of data items, each data item having a plurality of binary coded decimal digits, said memory device comprising:

a single storage means;

control means coupled to said single storage means and responsive to said data items for causing combined digits sequentially arranged from a lower order combined digit to a higher order combined digit to be stored in said single storage means, each combined digit being formed under control of said control means which includes means for combining the same order digits of the data items and forming a plurality of bit groups sequentially arranged from a lower order bit group to a higher order bit group, each bit group comprising sequentially arranged same order bits of the same order digits of the data; and read-out means coupled to the output of said storage means for selectively reading out any given item of the data stored in said storage means by selectively reading out the bits constituting the given item of the data.

2. A memory device according to claim 1 further comprising means coupled to said read-out means for writing again the given item of the data read out from said storage means in an address location of said storage means which is shifted to the right relative to the location of the data read out from said storage means.

3. A memory device for storing a plurality of data items, each data item having a plurality of binary coded decimal digits, said memory device comprising:

storage means including a single shift register;

control means coupled to said single shift register and responsive to said data items for causing combined digits sequentially arranged from a lower order combined digit to a higher order combined digit to be stored in said single shift register, each combined digit being formed under control of said control means which includes means for combining the same order digits of the data items and forming a plurality of bit groups sequentially arranged from a lower order bit group to a higher order bit group, each bit group comprising sequentially arranged same order bits of the same order digits of the data;

read-out means coupled to the output of said storage means for selectively reading out any two given items of data stored in said storage means;

an arithmetic operation circuit coupled to said read-out means for conducting arithmetic operations on the two data items selectively read-out from said storage means; and writing means coupled to said arithmetic operation circuit and to said storage means for writing in any given address of said storage means one of the two data items selectively read-out of the output of the arithmetic operation circuit.

4. A memory device according to claim 3 wherein said storage means comprises:

a shifting circuit for cyclically shifting the data stored in said single shift register, said shifting circuit including said single shift register;

a first auxiliary shift register connected to the output of said single shift register and delaying by one combined digit time the data stored in said single shift register; and gating means coupled to said auxiliary shift register for writing in said single shift register the output of said first auxiliary shift register.

5. A memory device according to claim 3 wherein said read-out means includes:

a plurality of second auxiliary shift registers which are connected in series and which are coupled to the output of said single shift register, each second auxiliary shift register storing one bit of the output of said single shift register; and gating means coupled to said second auxiliary shift registers for reading out from said second auxiliary shift registers simultaneously the same order bits out of the bits which constitute any two data items.

6. A memory device according to claim 3 including means coupled to said arithmetic operation circuit for writing the output data of said arithmetic operation circuit in said single shift register without conducting any shifting operation.

7. A memory device according to claim 3 including means coupled to said arithmetic operation circuit for writing the output data of said arithmetic operation circuit in said single shift register with the output data left shifted to the left by one combined digit time.

8. A memory device according to claim 7 wherein said means for writing the output data of said arithmetic operation circuit with the output shifted to the left comprises a third auxiliary shift register coupled to the output of said arithmetic operation circuit and delaying the output thereof by one combined digit time.

* * * * *